July 17, 1951  F. L. SPIVEY  2,560,828
POULTRY AND LIVE STOCK FEEDER
Filed Oct. 16, 1944  3 Sheets-Sheet 1

INVENTOR.
Frank L. Spivey

July 17, 1951  F. L. SPIVEY  2,560,828
POULTRY AND LIVE STOCK FEEDER
Filed Oct. 16, 1944  3 Sheets-Sheet 2

INVENTOR.
Frank L. Spivey

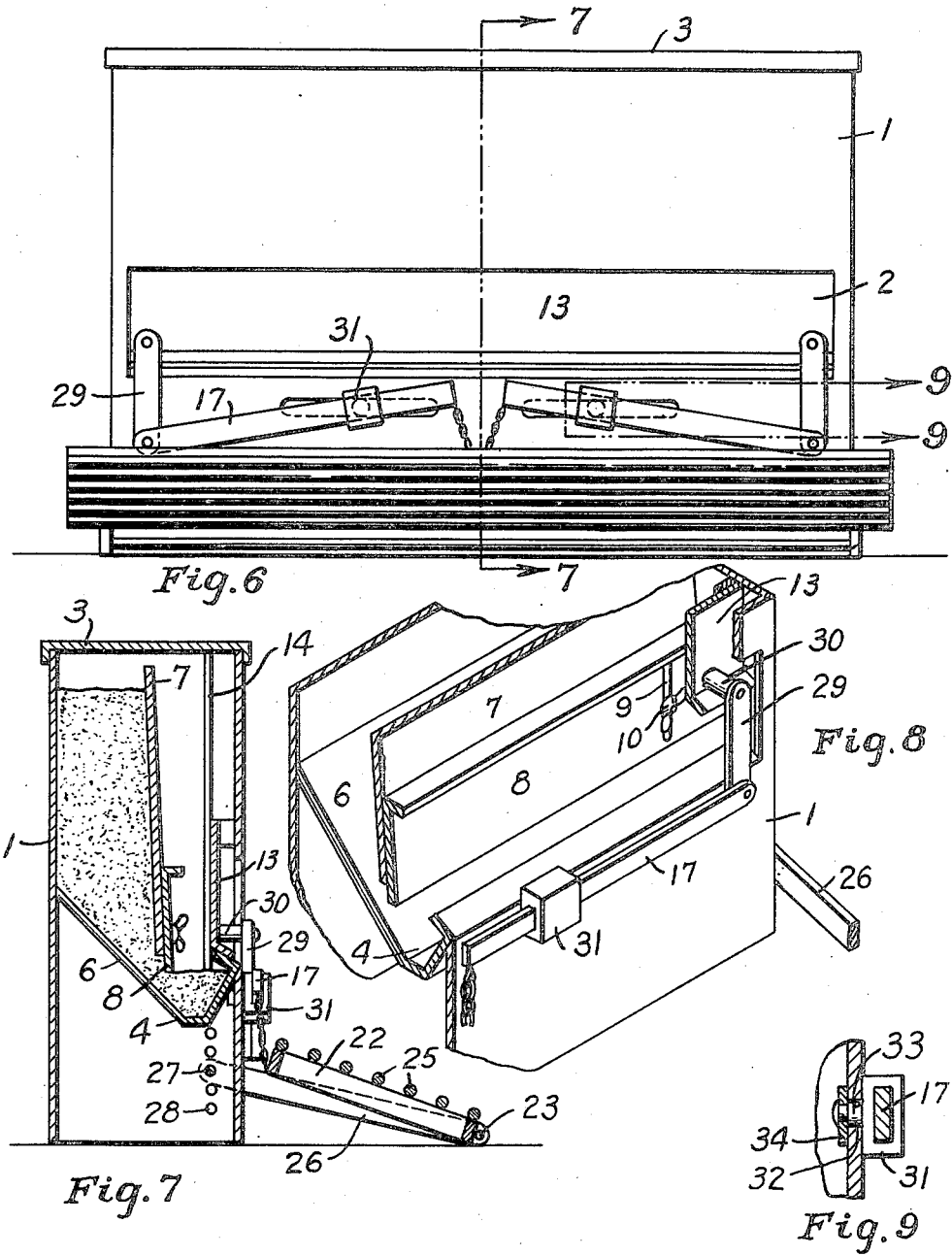

Patented July 17, 1951

2,560,828

UNITED STATES PATENT OFFICE 2,560,828

POULTRY AND LIVE STOCK FEEDER

Frank L. Spivey, San Antonio, Tex., assignor of one-half to E. C. Overall, San Antonio, Tex.; Hazel Florence Spivey administratrix of said Frank L. Spivey, deceased Application October 16, 1944, Serial No. 558,886

3 Claims. (Cl. 119—55)

1

My invention relates to a sanitary poultry or live stock feeder which will hold a substantial quantity of feed and which is automatic in action thereby eliminating the necessity of a caretaker's attention at feeding periods.

An object of the invention is to provide a sanitary feeder which will protect the feed against the elements of rain, dust or storm between feeding periods as well as against wastage by birds, rats or mice.

Another object of the invention is to provide a feeder which is simple in construction and operation.

A further object of the invention is to provide a feeder which is low in cost whereby the savings in feed and labor will render the feeder a profitable investment for any poultryman or stockman.

A further object of the invention is to provide a feeder which will prevent wastage of the feed by poultry or animals other than those for which the feed is intended.

Other objects and advantages of the invention will be apparent during the course of the following description.

These objects are accomplished as described in the following specification and illustrated in the accompanying drawings in which like reference characters refer to like parts throughout the various views.

In the drawings:

Fig. 6 is a side elevational view of a single type feeder, illustrating an alternative actuating means interposed between the door and platform of the feeder.

Fig. 7 is a vertical sectional view of the single type feeder taken on the line 7—7 of Fig. 6.

Fig. 8 is a fragmentary isometric projection of a portion of one end of the single type feeder.

Fig. 9 is an enlarged fragmentary sectional view taken on the line 9—9 of Fig. 6.

2

Figure 2:
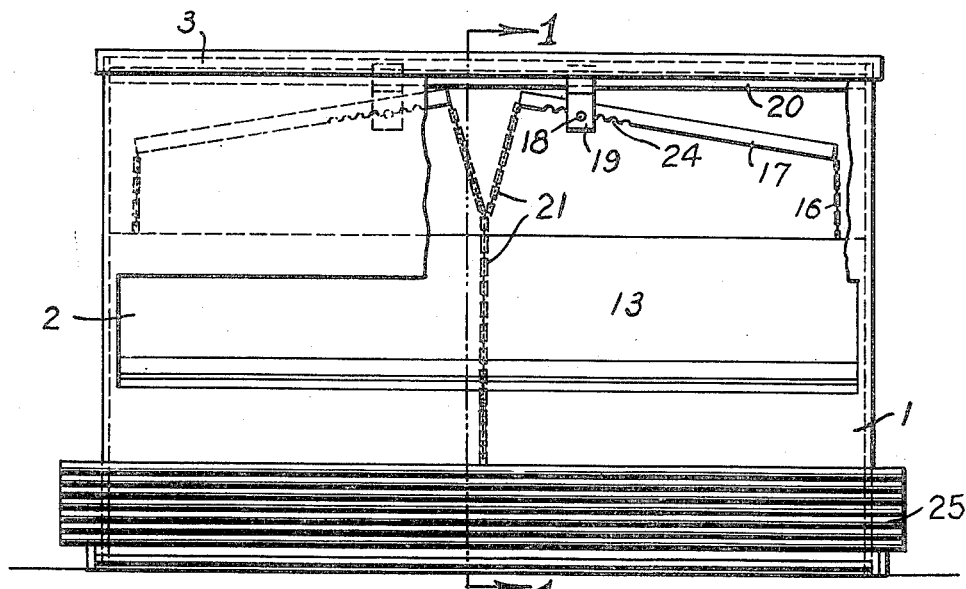
Fig. 2 is a side elevational view of the feeder, with a portion of the housing broken away, as seen from the right hand side of Fig. 1.
Figure 1:
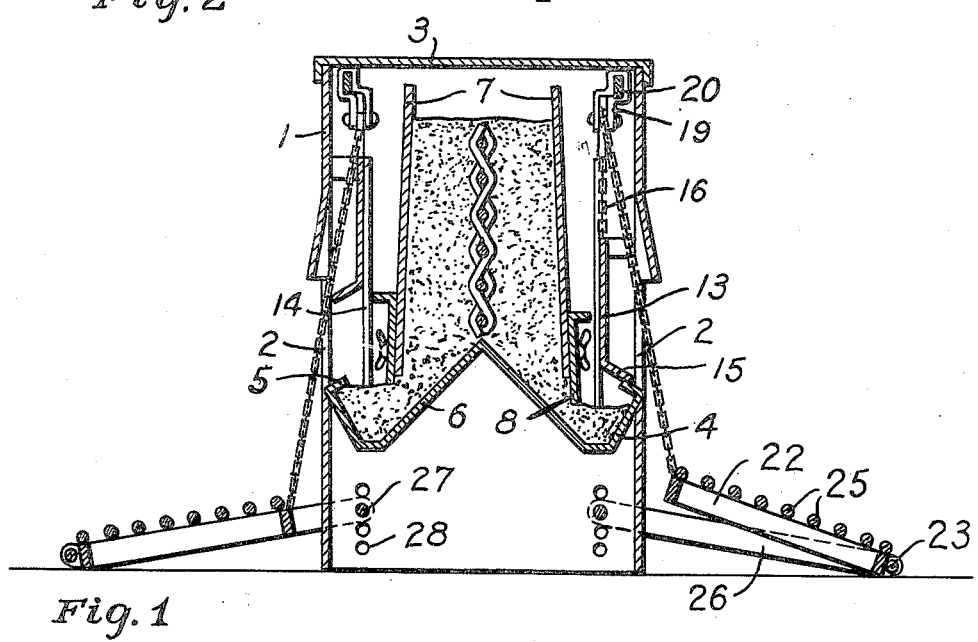
Fig. 1 is a vertical sectional view of a double feeder, taken on the line 1—1 Fig. 2, illustrating the feeding door on one side in its open position and the feeding door on the opposite side in its closed position.

In describing the operation of the feeder attention is invited to Figs. 1 and 2 which illustrate a box-like housing 1 provided with the feeding openings 2 on each side. The upper end of the housing is open and is provided with the removable lid 3. Coinciding with the lower edges of the feeding openings 2 are the upper edges of the feed troughs 4. It will be noticed that the outer edges of the feed troughs are provided with the flanges 5 projecting inwardly and inclined upwardly. These flanges extend the entire length of the feeding openings and serve to retard the entrance of rain into the feed troughs when the doors are in their closed positions and the wastage of feed from the troughs caused by agitation of the feed by poultry or live stock when the doors are in their open positions. It will be noticed that the outer sides of the feed troughs are inclined inwardly from their upper edges to the bases of the troughs. This construction eliminates sharp corners in the bottoms of the feed troughs in which feed might accumulate and become stale. The two feed troughs are joined together and formed integral with the angular portion 6 which extends upwardly toward the center of the housing 1. The entire feeding trough unit is securely fastened to the housing 1.

Interior the housing 1 and rigidly attached thereto are the feed bin walls 7 which extend the entire length of the housing 1 and preferably though not absolutely are slightly divergent from their upper to their lower limits in order to prevent wedging of the feed in the feed bin thus formed. The lower ends of the walls 7 terminate at a substantial distance above the angular portion 6 of the feed trough structure in order to provide ample space for the passage of feeding material from the feed bin to the feeding troughs. Vertically movable gates 8 are provided at the lower limits of the walls 7, these gates being adjustable to govern the amount of feed admitted to the feed troughs 4. Slots 9 (Fig. 3) are provided, proximate each end of the gates 8, to permit vertical movement of the gates 8 over screws passing through the walls 7 of the feed bin. Suitable wing nuts 10 clamp the gates 8 in position after they have been adjusted.

Figure 3:
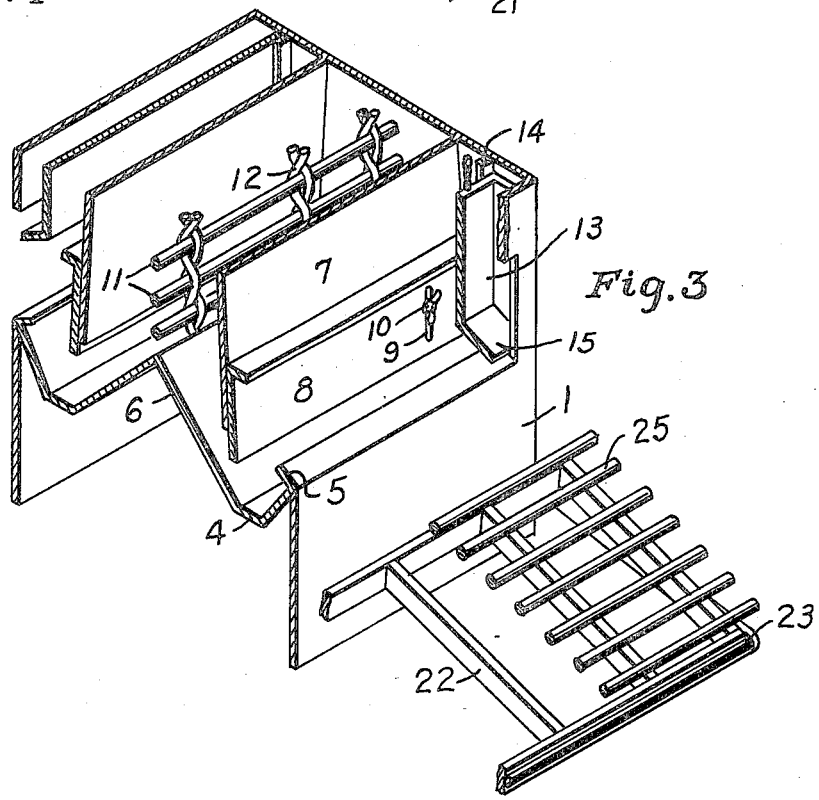
Fig. 3 is a fragmentary isometric projection of a portion of one end of the feeder.

As an added precaution against the packing of feed in the feed bin, a series of rods 11 are attached to the housing 1 and extend the length of the housing. These rods are located one above the other as illustrated in Figs. 2 and 3. A number of lacing rods 12 may be used to stiffen and maintain the positions of the rods 11 along their length and depth. As the feed proceeds downwardly through the feed bin, vacant pockets will be formed beneath each of the rods 11 and thus aid in preventing packing of the feed. The rods being in the approximate center of the feed bin make a two compartment feed bin which will prevent stock or poultry on one side of the feeder from getting more than its share of the feed. This is particularly necessary where the feeding subjects are kept in separate pens, and one unit feeder is used.

Vertically sliding doors 13 are provided on each side of the housing 1. These doors are fitted to slide between retaining strips 14 attached to each end of the housing and the sides of the housing. Flanges 15 at the lower end of the doors are so formed as to mate with the flanges 5 of the feed troughs 4 when the doors are in their closed positions thereby providing a seal for preventing the entrance of rain into the feed troughs.

The flanges 5 of the trough sides provide seats for the flanged bottom doors permitting the doors to seat with greater impact than without said flanges. The flanges on the trough sides receiving the impact of the doors in seating because of the position to the trough sides cause a greater vibration to be set up than would be possible were they forced to seat upon trough sides without flanges. The impact of the flanged bottom doors in seating produces jolts to, and vibrations within the flanges on the trough sides. The jolts and vibrations are then transmitted by and from the door seat flanges to the feed within the feed bin through connecting parts of the feeder; namely, the feed trough, the housing and the feed bin.

Attached to the tops of the doors near each end thereof are chains, or links, 16 which connect the doors with the outer ends of the balance levers 17. The levers 17 are supported by pivot pins 18 carried by the pivotal collars 19 which are slidably mounted on the beams 20 extending the length of the housing 1. Ends of beams 20 are rigidly mounted to ends of feeder by welding or any other suitable means. Chains, or links, 21 connect the inner ends of the levers 17 with the inner edges of feeding platforms 22, said platforms being pivoted at their outer limits on the pivots 23.

Figure 4:
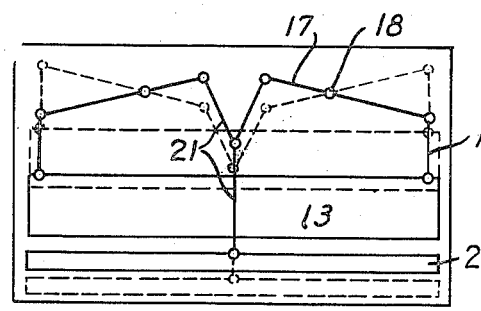
Fig. 4 is a diagrammatic view of the operating positions of the feeder door actuating mechanism.
Figure 5:
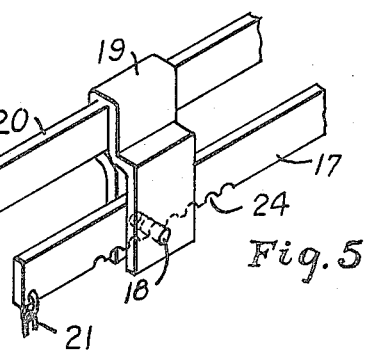
Fig. 5 is a fragmentary isometric projection of the adjustable weight balancing means interposed between the doors and platforms of the feeder.

As illustrated in the right hand half of Fig. 1, the door 13 is in its lowermost, or closed, position while the feeding platform 22 is in its raised position. This corresponds with the positions of the various parts shown in full lines in the diagrammatic view of Fig. 4. However, as soon as the fowl, or animal, for which the feeder is intended steps upon the feeding platform, the platform will be lowered to the position shown in the left hand half of Fig. 1. The positions of the various parts will then correspond with the dotted lines of the diagrammatic view shown in Fig. 4.

It will be noticed that the lower edges of the levers 17 are provided with a series of notches 24. These notches are formed to fit the pivot pins 18 in order to prevent slipping of the levers 17 on the pins 18 after adjustment.

Since it is required that the doors 13 remain normally in their lowermost, or closed, positions, it is evident that the weight of the doors must produce a greater moment on the outer ends of the levers 17 than the weight of the feeding platforms produce on their inner ends. Also, the weight which must be applied to the platforms in order to cause the doors to rise to their open positions will vary in individual cases. Therefore, the pivotal collars 19 are slidable on both the beams 20 and the levers 17. By this arrangement a proper balancing relation between the doors 13 and the platforms 22 can always be obtained by sliding parts 19 in any desired direction over beams 20 and levers 17.

It is apparent that changing the positions of the pivotal collars 19 with relation to the beams 20 and the levers 17 will also change the amount of movement required by the platforms 22 for properly operating the doors 13. In order to compensate for this variation, stops 25, formed by the projecting ends of the rods which compose the upper surfaces of the feeding platforms 22, are engageable with the upper edges of the members 26. The members 26 are attached to each end of the housing 1 and extend therefrom to form supports for the pivots 23. The outer ends of the members 26 rest upon the ground while their inner ends are attached to the ends of the housing by means of suitable pins, or bolts, 27. A series of holes 28 are provided in each end of the housing for the reception of the pins, or bolts, 27. Thus, by moving the connection of the members 26 from one hole to another, the downward movement of the feeding platforms is governed, preventing undue strain on the connecting means between the doors 13 and the platforms 22 when the doors are in their raised positions. A further object of the stops 25 is to provide a means whereby a jar, or vibration, will be transmitted to the housing 1 through the medium of the members 26 upon engagement of the stops 25 with the members 26 thereby aiding in preventing the packing of feed in the feed bin.

While the feeder above described has been disclosed as a double type feeder from which feed may be obtained from either side, it can readily be converted into a feeder from which feed is obtainable from one side only by merely disconnecting one of the chains, or links, 21 from the platform on one side of the feeder. On whichever side the chain, or link, is disconnected the door 13 will remain constantly in its closed position.

Figs. 6 to 9 inclusive illustrate a single type feeder. The single type is similar to the double type except that the inclined portion 6 extends to the back of the feeder and the connections between the feeding platform 22 and the door 13 are all located exterior the housing and connect to the lower portion of the door instead of the upper portion. In this instance, the outer ends of the levers 17 connect to the door by means of the links 29 and the stub shafts 30 which project from the outer face of the door 13. The parts 31, through which the levers 17 are free to slide, are provided on their inner sides with round extensions 32 which pass through slots 33 in the front of the housing 1 and are held in position by the washers 34 on the inner ends of the extensions 32. Thus, adjustment of the parts 31 may be made to secure the proper balance between the door and the feeding platform in the same manner as for the double type feeder first described.

Having thus described my invention I claim and desire to secure by Letters Patent of the United States the following:

1. In combination, a housing, said housing having sides provided with feeding openings, feed troughs in said housing in communication with said feeding openings in the sides of said housing, connecting means between said feed troughs, said connecting means being inclined inwardly and upwardly from the inner limits of each feed trough base to the central portion of said housing, said feed troughs being provided with flanged sides, said flanges being inclined inwardly and upwardly, a feed bin within said housing, said feed bin having an open top, and an open bottom, said housing having an open top in communication with said feed bin, vertically adjustable gates carried by the walls of said feed bin for regulating the feed passage area between said feed bin and feeding troughs, vertically slidable doors for said feeding openings, said doors having stop means mounted to the bottoms thereof, said stop means being flanges which mate with the flanges of the trough sides whereby jolts and vibrations are produced by the impact of the doors' flanges in seating upon the trough sides, feeding platforms adjacent said feeding openings, connecting means between said vertically slidable doors and said feeding platforms whereby the downward movements of the feeding platforms will effect upward movements of said vertically slidable doors and gravity means for closing said doors.

2. In combination, a device as claimed in claim 1, wherein the connecting means between said doors and said platforms includes links and levers, said levers being mounted in collars, the collars being slidable over beams supported by the housing.

3. In combination, a housing, said housing having sides provided with feeding openings and having an open top, lid means for closing said open top, a feed bin within said housing having an open top, feed troughs having sides within said housing in communication with the feeding openings in the sides of said housing, flanges on the upper edges of said trough sides which bend inwardly and upwardly, vertically slidable doors having flanged bottoms which mate with the flanges on the trough sdies whereby jolts and vibrations are produced by the impact of the door in seating on the flanges of the trough sides and transmitted to the feed bin to prevent feed from wedging in the feed bin, feeding platforms mounted for vertical movement exterior and adjacent said feeding openings, balancing pivotal collars supported by said housing in longitudinal slidable relation thereto, weight balancing levers mounted in said housing within said balancing pivotal collars, connecting means between the doors and said platforms to permit vertical movement of the doors so that in seating the flanges on the bottom of the doors will mate with the flanges on the troughs sides and gravity means for closing the doors.

FRANK L. SPIVEY.

REFERENCES CITED

The following references are of record in the file of this patent:

UNITED STATES PATENTS

| Number | Name | Date |
|---|---|---|
| 891,693 | Heisey | June 23, 1908 |
| 914,720 | Harper | Mar. 9, 1909 |
| 1,081,134 | Myer et al. | Dec. 9, 1913 |
| 1,257,399 | Robbins | Feb. 26, 1918 |
| 1,463,862 | Wolf | Aug. 7, 1923 |
| 1,530,101 | Ashing | Mar. 17, 1925 |
| 1,629,334 | Bennett | May 17, 1927 |
| 1,629,979 | Steinback | May 24, 1927 |
| 1,658,018 | Hoffa | Jan. 31, 1928 |
| 2,066,736 | Muse | Jan. 5, 1937 |
| 2,108,102 | Busch | Feb. 15, 1938 |
| 2,168,639 | Yeaman | Aug. 8, 1939 |
| 2,386,010 | Spivey | Oct. 2, 1945 |